June 30, 1931. C. W. SEXTON 1,812,806
AIRCRAFT OR OTHER BRAKE
Filed Oct. 17, 1929 2 Sheets-Sheet 1
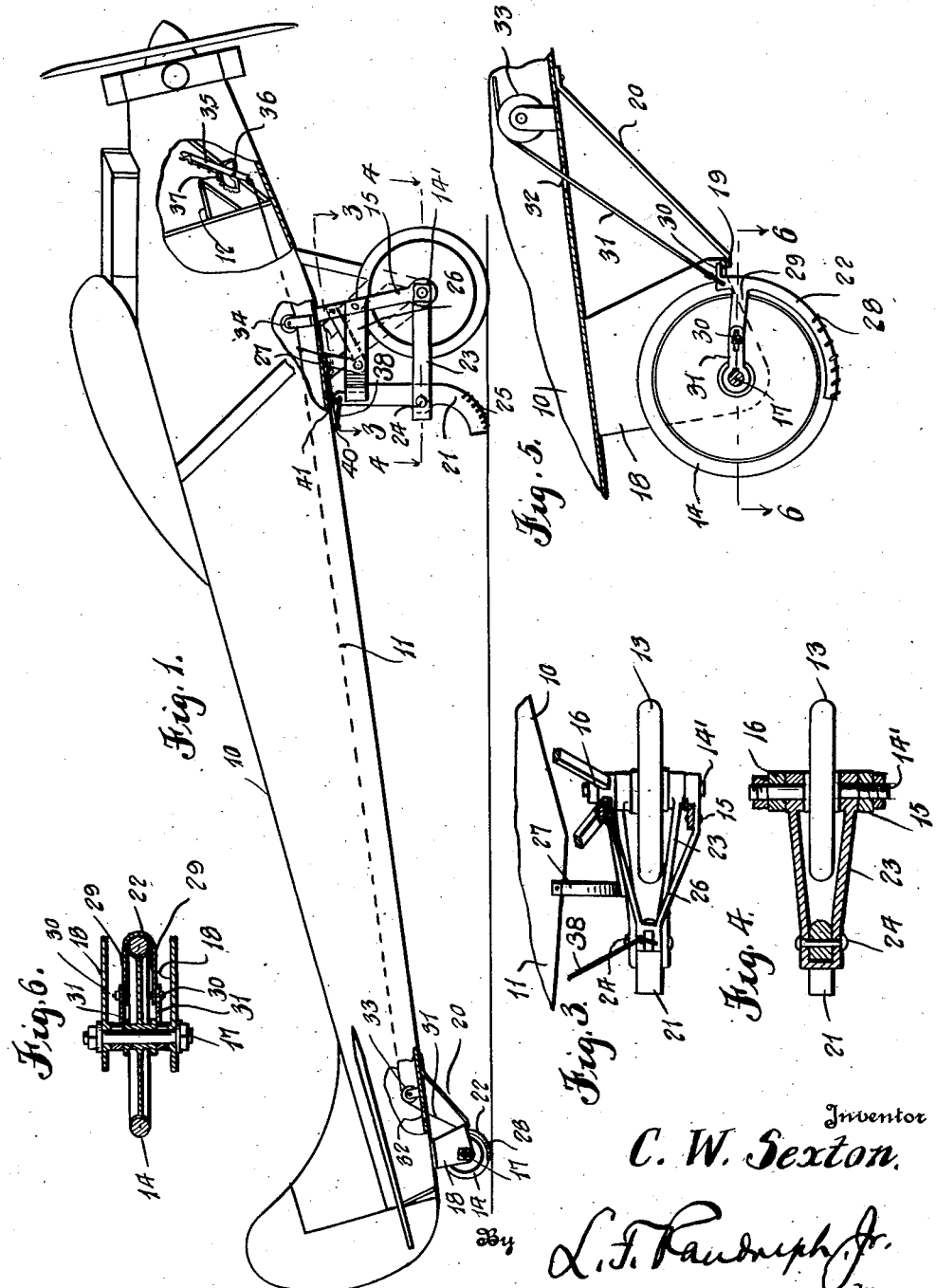

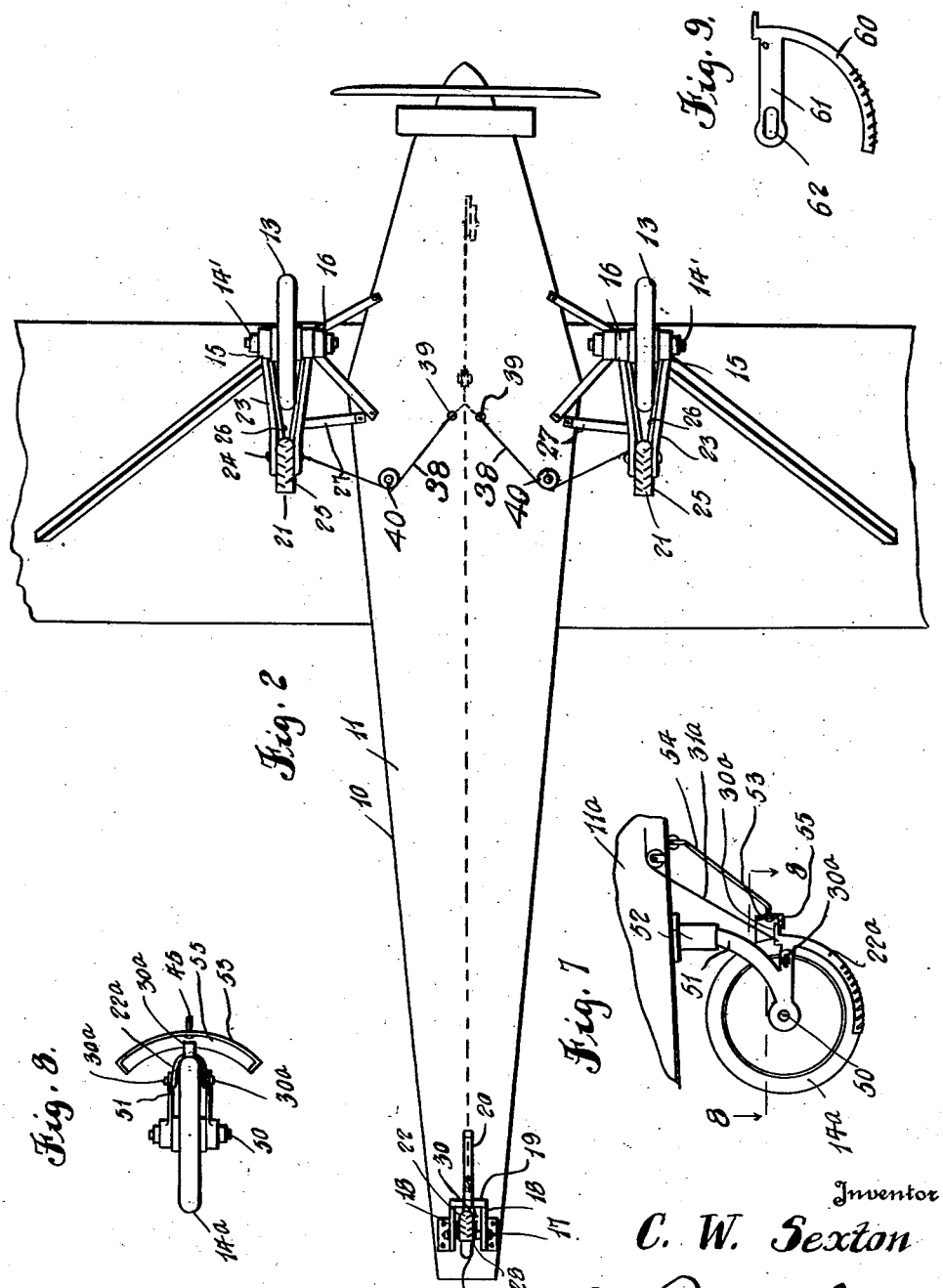

Patented June 30, 1931

1,812,806

UNITED STATES PATENT OFFICE

CORYDON W. SEXTON, OF FAYETTEVILLE, NORTH CAROLINA

AIRCRAFT OR OTHER BRAKE

Application filed October 17, 1929. Serial No. 400,323.

This invention relates to a brake primarily adapted for use on air craft of the heavier than air type.

It is aimed to provide a novel construction utilizing braking means adjacent each of the two front and single rear wheels, normally elevated and adapted to be applied and controlled from the fuselage.

Another object is to provide a construction wherein the lower portion of the shoe for the rear wheel in addition to having a raising movement will move toward and away from the wheel during lowering and raising, respectively.

Additional objects and advantages will become apparent from a consideration of the description following taken in connection with accompanying drawings illustrating an operative embodiment and wherein:—

Figure 1 is a side elevation of an aeroplane, partly broken away, constructed in accordance with my invention, Figure 2 is an inverted plan or bottom view thereof, Figure 3 is a detail sectional view taken on the line 3—3 of Figure 1, Figure 4 is a detail sectional view taken on the line 4—4 of Figure 1, Figure 5 is a detail sectional view illustrating the rear wheel and associated brake mechanism, Figure 6 is a sectional view taken on the line 6—6 of Figure 5, Figure 7 is a view similar to Figure 5 taken through a modified form, Figure 8 is a detail section taken on the line 8—8 of Figure 7, and Figure 9 is a detail elevation of one form of brake shoe.

Referring specifically to the drawings, 10 designates a conventional aeroplane having a fuselage 11, a cock pit 12 therein, a pair of ground wheels 13 and a rear ground wheel 14. The wheels 13 are journaled on axles 14 suitably supported by brackets 15 and 16, attached to the fuselage, plane or other part of the airship. The rear wheel 14 is keyed to an axle 17 journaled in depending plates or brackets 18 carried by the fuselage 11, which plates 18 are in spaced relation and connected by a bridge strip 19 to which a brace 20 is fastened and which is also fastened to the fuselage 11.

The improved braking mechanism employs a pair of shoes 21 one adjacent each front wheel 13 and a single shoe 22 adjacent the rear wheel 14. Arms 23 are pivoted on the axle 14' and mount a pivot pin 24 on which the shoes 21 are journaled. Such shoes 21 at the ground engaging portion is roughened as at 25 to increase tractive engagement with the ground. Such shoes 21 are normally maintained out of contact with the ground but when moved into ground engaging position as shown in Figure 1, the upper end thereof is adapted to abut a yoke 26 fastened to the brackets 15 and 16, which reenforces structure against the upward thrust when such shoes are lowered. V-shaped braces 27 are fastened to the fuselage, the yoke 26 and the brackets 15.

Like the shoes 21, the shoe 22 is normally elevated out of contact with the ground. Such shoe 22 is arcuate so as to conform to the wheel 14 and at its lower end is roughened as at 28 for the same purposes as the roughening 25. Shoe 22 has two arms 29 which are pivotally connected at 30 to brackets 31 keyed or non-rotatably fastened on the axle 17. In the lowermost or applied position of the shoe 22, it rests on the strip 19 through the medium of a lug 30 thereon, so as to take the strain off of the wheel 14. It will be noted that the wheel 22 is adapted to swing from the axis 30 which is eccentric to that at 17 and accordingly as the shoe is raised, the lower end thereof will move out of contact with the wheel 14 and that there will be less likelihood of interference between the shoe and the wheel.

Suitably fastened to the shoe 22 at the upper end is a flexible draw element 31 which passes through an opening 32 in the fuselage and thence over a guide pulley 33 within the fuselage, thence under a guide pulley 34 also within the fuselage beyond which it is attached to a manually operable lever 35 located in the cock pit 12. The lever 35 is pivoted at 36 and has a suitable latching or locking mechanism 37, of conventional form associated therewith. Extending from the draw element 31 are branches 38 of the same material as the draw element, which pass through openings 39 in the fuselage 11 guided over direction pulleys 40 on the exterior of the fuselage beyond which they are attached as at 41 to the shoes 21. Certain of said direction pulleys 40 are located rearwardly of the connections 41 of the shoes 21, so as to cause movement of the shoes 21 in the proper direction upon a pull being exerted on the branch cables 38.

As a result, when the lever 35 is in its forward position as shown in Figure 1, the shoes 21 and 22 are lowered and in braking contact with the ground. In order to elevate the shoes, the lever 35 is pulled rearwardly which exerts a drawing action on the cables or elements 31 and 38, thus elevating the shoes 21 and 22 out of contact with the ground and maintaining them in such normally retracted position through the medium of the latching mechanism 37 associated with said lever.

A modified form is shown in Figure 8 wherein the rear wheel 14$^a$ equivalent to that at 14 is journaled on an axle 50 carried by a bracket 51 which is swiveled in a bearing or socket 52 carried by a fuselage 11$^a$, the wheel 14$^a$ thus being capable of swinging laterally. The brake shoe associated therewith is designated 22$^a$, being pivoted to the bracket 51 at 30$^a$. A draw element attached to the shoe 22$^a$, equivalent to that at 31 is shown at 31$^a$. An arcuate bracket 53 of angle form in cross section is supported by suitable means 54 from the fuselage 11$^a$. The lower flange 55 of such bracket has the lug 30$^a$, equivalent to that at 30 in contact therewith and the shoe is lowered so as to take the strain off of the wheel 14$^a$. When the wheel 14$^a$ swings laterally, the lug 30$^a$ swings in an arc and at all times is supported by the flange 55 except when elevated.

In Figure 9, a modified form of shoe for the rear wheel is shown, the same being designated 60 and having rearwardly extending arms 61 provided with elongated slots 62. Such slots 62 may serve to fasten the shoe directly and pivotally on either axle 17 or 50 and the elongated slots 62 enabling the shoe to move toward and away from the wheel, especially away from the wheel when it is elevated or moved to retracted position.

While the invention has been shown as applied specifically to aircraft, it is to be realized that the brake structure or part thereof, particularly that for the rear wheel, may also be applied to vehicles generally and for instance automobiles, trucks and street cars, for emergency use.

Various changes may be resorted to provided they fall within the spirit and scope of the invention.

I claim as my invention:—

1. A brake mechanism in combination with a wheel, an upstanding brake shoe, means mounting said shoe for movement on an axis eccentric to that of the wheel for the purpose specified, and means engageable by said shoe above its pivot as it is applied to aid in relieving the wheel of the incidental strain.

2. In an airship, a ground wheel thereon, an upstanding brake shoe for said wheel in the rear thereof engageable with the ground and pivoted on an axis eccentric to the wheel, means on the airship operable to control the shoe, and means on the airship engageable by the shoe above its pivot incidental to application thereof to aid in relieving the wheel of strain.

3. In an airship, a fuselage, bracket means depending therefrom, a wheel pivoted to said bracket means, an upstanding braking shoe in the rear of the wheel engageable with the ground and associated with said wheel, said shoe being pivoted on an axis eccentric to the wheel and having a lug above its pivot engageable with the bracket means and applied for the purpose specified.

4. In an airship, a fuselage, bracket means depending therefrom, a wheel pivoted to said bracket means, an upstanding braking shoe in the rear of the wheel engageable with the ground and associated with said wheel, said shoe being pivoted on an axis eccentric to the wheel and having a lug above its pivot engageable with the bracket means and applied for the purpose specified, and draw means connected to said shoe to control the position thereof.

5. An aeroplane having a fuselage, bracket means depending therefrom having a bridging strip connecting the same, a wheel pivoted to said bracket means, a brake shoe, means pivoting said brake shoe for movement relatively to the wheel, a lug on said brake shoe engageable with said strip as the shoe is applied to aid in relieving the wheel of strain, a brace extending from the fuselage and connected to said strip, and operating means extending from the fuselage and connected to said shoe.

6. An airship having depending bracket means, a wheel mounted thereby, an upstanding brake shoe pivoted to said means, and means on said bracket means engageable by the brake shoe above its pivot as it is applied to take the upward thrust.

7. An airship having depending bracket means, a wheel pivoted thereto, an arm extending rearwardly from said means, an upstanding brake shoe engageable with the ground pivoted to said arm, and a yoke extending rearwardly from said bracket means above said arm and engageable by the upper end of said arm to take the thrust when the shoe is lowered, and means normally maintaining the shoe elevated and operable to permit lowering thereof.

8. In combination with a vehicle body, a wheel, means mounting the wheel for lateral swinging movement, a brake shoe carried by said means, and means carried by the vehicle to engage the brake shoe when applied comprising an arcuate bracket having a flange engageable by the shoe.

9. In combination with a vehicle body, a wheel, means mounting the wheel for lateral swinging movement, a brake shoe carried by said means, and a bracket carried by the vehicle to be overlapped by and engage the brake shoe when applied.

In testimony whereof I affix my signature.

CORYDON W. SEXTON.